United States Patent [19]

Schurmann

[11] Patent Number: 4,936,919

[45] Date of Patent: Jun. 26, 1990

[54] METHOD OF AND DEVICE FOR CONTINUOUSLY SWELLING STARCHY RAW MATERIALS

[75] Inventor: Gerald Schurmann, Herzebrock-Clarholz, Fed. Rep. of Germany

[73] Assignee: Westfalia Separator AG, Oelde, Fed. Rep. of Germany

[21] Appl. No.: 123,846

[22] Filed: Nov. 23, 1987

[30] Foreign Application Priority Data

Dec. 6, 1986 [DE] Fed. Rep. of Germany ....... 3641732

[51] Int. Cl.⁵ .............................................. C08B 30/20
[52] U.S. Cl. ..................................... 127/23; 426/507; 426/506
[58] Field of Search ...................... 426/506, 481, 507; 127/68, 23

[56] References Cited

U.S. PATENT DOCUMENTS

| | | | |
|---|---|---|---|
| 3,637,399 | 1/1972 | Neel | 127/68 |
| 4,106,487 | 8/1978 | Randall et al. | 127/68 |
| 4,416,701 | 11/1983 | Huster et al. | 426/481 |
| 4,517,022 | 5/1985 | Harvey | 127/68 |

OTHER PUBLICATIONS

Whistler et al., "Starch Chemistry & Technology", Academic Press, vol. 11 (1967), pp. 32–51.

*Primary Examiner*—R. B. Penland
*Attorney, Agent, or Firm*—Sprung Horn Kramer & Woods

[57] ABSTRACT

The method allows in particular the continuous swelling of granular, starchy raw materials subject to mechanically increased hydraulic pressure. Extraction is very effective because the steep and the raw material flow in opposite directions. The opposed currents are produced because the swelling section is upright, so that gravity forces the heavier raw material down through the rising steep.

5 Claims, 1 Drawing Sheet

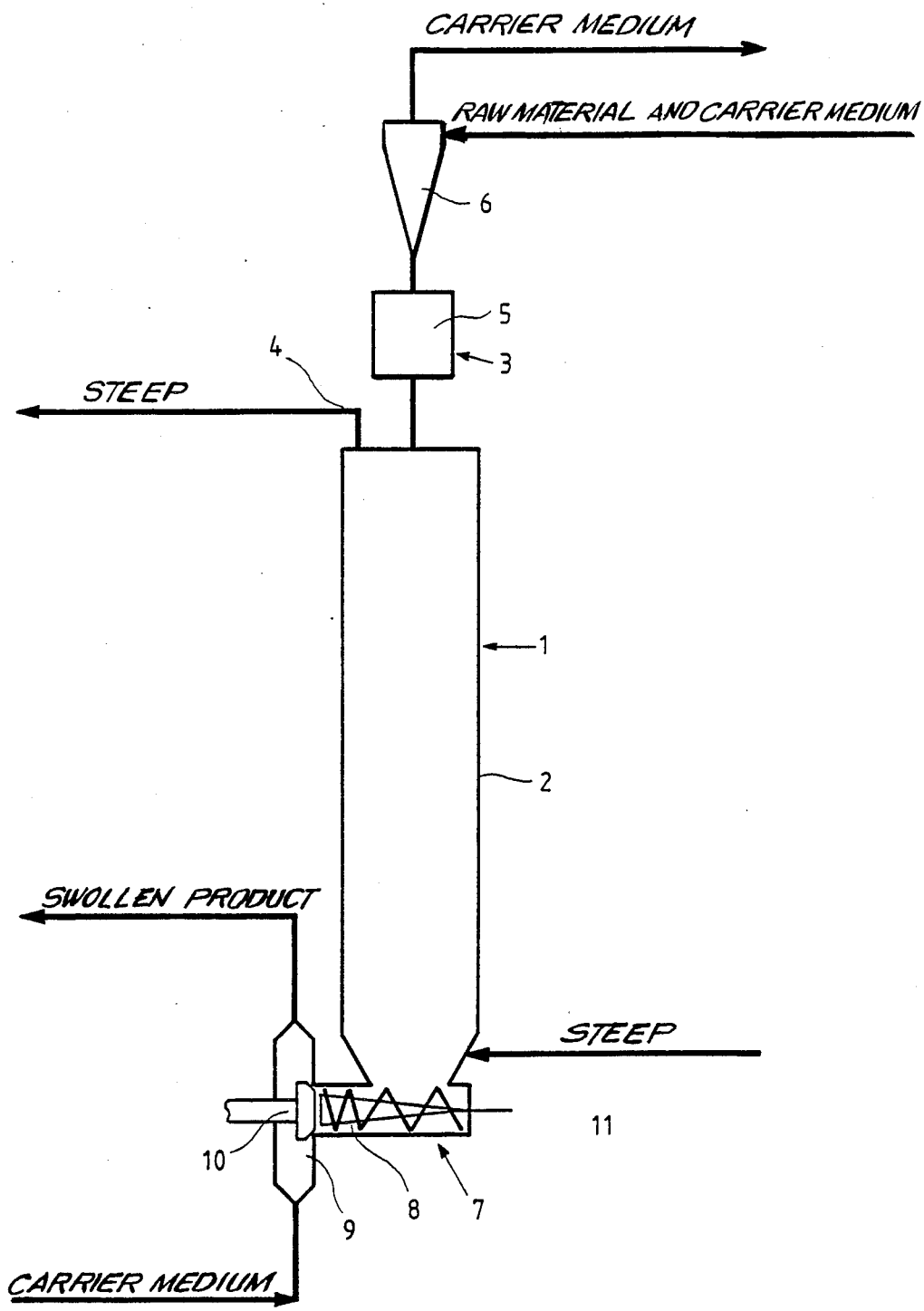

METHOD OF AND DEVICE FOR CONTINUOUSLY SWELLING STARCHY RAW MATERIALS

BACKGROUND OF THE INVENTION

The present invention relates to a method of continuously swelling starchy raw materials, whereby the raw material is supplied at a temperature below the gelatinization point of the starch and under a mechanically increased hydraulic pressure to a section wherein it is swelled in a steep.

A method of this type is known from German Patent 3 110 464 and is technically termed "brief swelling." It is employed to obtain starch from grain, especially from maize.

To attain rapid water uptake, the raw material is subjected to swelling at a pressure of at least 5 bars, and of 10 to 50 bars for maize, for 2 to 3 hours prior to mechanical processing in a high-pressure device. Measured portions of processing water are added to granular maize, which is then continuously pumped to a swelling section in the form of a coil of pipe, in which the brief swelling occurs at a pressure of 10 to 50 bars, and preferably 15 bars, and at a temperature of 50° to 60°. At the exit from the swelling section is a tank that is provided with a filter. The excess water is extracted through the filter and a pressure-release mechanism decreases the pressure to break up the maize.

One drawback to the method is that the raw material and steep travel through the swelling section in the same direction, which makes it impossible to extract all of the soluble constituents, some of which are undesirable.

It has been discovered, that, although a pressurized plant with this type of design and operation is appropriate for the continuous swelling of milled cereal products, it involves considerable drawbacks in relation to whole-grain raw materials.

Unmilled and whole-grain raw materials can easily agglomerate and clog up a swelling section in the form of a coil, especially upstream of curves and constrictions, bottlenecking the overall system and requiring expensive manual cleaning. Another problem encountered with whole-grain raw materials involves the proposed approach of continuously extracting the product from the pressurized system while simultaneously breaking it up. Since decreasing the high pressure demands considerable reduction in the extraction-point cross-section of the pressure-release mechanism, that mechanism can also clog up completely or to some extent, making it difficult or impossible to break up the swollen product to a specific size. Furthermore, whole-grain raw materials cannot be extracted from the aforesaid pressure-release mechanism unaccompanied by a considerable proportion of steep, the loss of which increases the energy consumption of the plant.

Introducing the raw material into the pipeline with a pump is also a drawback because, in addition to the technologically requisite pressure elevation, enough power must be applied to force the raw materials through the coil, and the raw material backs up at the pressure end, causing wear in any appropriate type of pump.

SUMMARY OF THE INVENTION

The object of the present invention is to improve the known method to the extent that extraction will be more efficient and that even whole-grain raw materials will be easy to process.

This object is attained in a method in accordance with the invention by an improvement wherein the steep and the raw material are introduced at opposite ends of an upright swelling section and the resulting swollen product and freed steep are extracted at the ends of the swelling section opposite the ones they were introduced at.

The raw material and steep in this method accordingly travel through the swelling section in opposite directions, resulting in a high gradient of concentration and hence in a high rate of extraction. The force of gravity is exploited to ensure that the difference in the densities of the two materials and in their resulting lifts will generate an automatic countercurrent. The upright swelling section prevents the granular raw material from settling and clogging it up.

The raw material is preferably supplied to the swelling section by means of an intake sluice. A hydrocyclone can be positioned upstream of the intake sluice to extract measured portions of raw material out of a carrier medium. The hydrocyclone also extracts undesirable floating foreign materials like particles of wood, husks, etc.

A removal sluice allows removal of the swollen product from the swelling section.

The object is attained in a device in accordance with the invention by the improvement wherein the swelling section is an upright cylindrical tank with a mechanism for supplying the raw material and a mechanism for removing the freed steep at the top and a mechanism for removing the swollen product and a mechanism for supplying the steep at the bottom. This design is especially practical for swelling granular raw materials that are denser than the steep. The grains pack together loose in the cylindrical tank. There is no risk of clogging up the system, even when the raw material increases in volume, because the continuous removal of solids at the floor of the devise always keeps the column of grain loosely packed. The looseness is also augmented by the steep as it travels in the opposite direction.

To keep the density of the column of solids uniform and to ensure that it advances at a constant rate, the height of the tank should be at least four times its diameter.

When processing polyhedral raw materials or materials with a high proportion of fragmentation, like maize for instance, the height of the tank must be at least seven times its diameter to ensure smooth operation of the system. The ratio of height to diameter also dictates in a practical way the extraction of soluble constituents from the raw material that is desirable in many applications. When the steep is removed continuously or discontinuously at the top of the tank, the uniform force exerted by the steep inside the column of solids ensures a high concentration gradient and hence a high extraction rate.

It is practical for the intake sluice to accommodate a circular-piston pump with a high specific output that can gently feed the granular material in at low speeds and with minimal amounts of carrier water against the pressure of the steep in the tank. Even a ratio of one part of raw material to one part of carrier water is sufficient for most types of cereal.

The swollen cereal can preferably be continuously removed without loss of freed steep by means of a sluice accommodating a plug-shaped worm that increasingly compresses the raw material over a short conveyance path. The compression provides a seal against the hydraulic pressure in the tank, allowing the raw material to be removed separate from the steep.

A sluice with a cylindrical housing accommodating a plug-shaped worm with a core that increases constantly in diameter has turned out to be practical.

The existing resilience of the swollen grains prevents the stress that they are subjected to during compression from having any negative effect on further processing in almost all applications.

The swollen product can be conveyed forward out of a trap adjacent to the plug-shaped worm and sluice in a simple way by means of a carrier medium.

To prevent steep from getting into the trap when the device is started up or is down, the trap can be sealed off from the sluice with a piston that travels back and forth axially.

BRIEF DESCRIPTION OF THE DRAWING

One embodiment of the invention will now be described with reference to the drawing in which the FIGURE shows an apparatus according to the invention.

DETAILED DESCRIPTION OF THE PREFERRED EMBODIMENTS

A swelling section 1 consists of an upright cylindrical tank 2. At the upper end of tank 2 is a mechanism 3 that supplies a raw material and a mechanism 4 that removes the freed steep. Raw-material supply mechanism 3 consists of an intake sluice 5 with an upstream hydrocyclone 6. At the bottom of tank 2 is a mechanism 7 in the form of a plug-shaped worm and sluice 8 that removes the swollen product. Worm and sluice 8 communicates with a trap 9 that can be sealed off from the sluice with a piston 10 that slides back and forth axially. The steep is supplied to tank 2 through a supply mechanism 11 at its bottom.

The granular raw material, which is usually suspended in a carrier medium, arrives in hydrocyclone 6, where measured portions are separated out and arrive in swelling-section tank 2 through intake sluice 5. Tank 2 is already full of pressurized steep supplied from mechanism 11. Trap 9 is sealed off from plug-shaped worm and sluice 8 by means of piston 10. The high specific gravity of the raw material causes it to sink to the bottom of tank 2 during the steeping process, where it arrives in sluice 8. Upon termination of the steeping time appropriate to the raw material, plug-shaped worm and sluice 8 commence operations and piston 10 is activated. It is now the swollen product itself that seals off the sluice. The product is conveyed uniformly into trap 9, whence it is conveyed by a carrier medium for further processing. The steep flows through tank 2 from the bottom to the top, flowing opposite the flow of the raw material and leaving the tank at the top through steep-removal mechanism 4. The opposing current results in optimum extraction.

It will be appreciated that the instant specification and claims are set forth by way of illustration and not limitation, and that various modifications and changes may be made without departing from the spirit and scope of the present invention.

What is claimed is:

1. A device for continuously swelling starchy unmilled and whole grain raw materials, comprising: a pressurized swelling section including a vertical cylindrical tank having a height at least four times its diameter, means for supplying raw material at the top of the tank including an intake sluice comprising a circular-piston pump, means for continuously removing steep at the top of the tank, means for continuously removing swollen solids at the bottom of the tank including a plug-shaped worm and a removal sluice and means for supplying pressurized steep at the bottom of the tank.

2. The device as in claim 1, wherein the height of the tank is at least seven times its diameter.

3. The device as in claim 1, wherein the plug-shaped worm and removal sluice comprises a cylindrical sluice with a worm that increases in diameter.

4. The device as in claim 1, further comprising a trap in communication with the plug-shaped worm and removal sluice and out of which the swollen product case be conveyed with a carrier medium.

5. The device as in claim 4, further comprising a piston mounted for axially sliding movement for sealing off the trap from the plug-shaped worm and removal sluice.

* * * * *